Dec. 22, 1953 J. G. SWAIN 2,663,592
WHEEL STRUCTURE
Filed Aug. 4, 1948 4 Sheets-Sheet 1
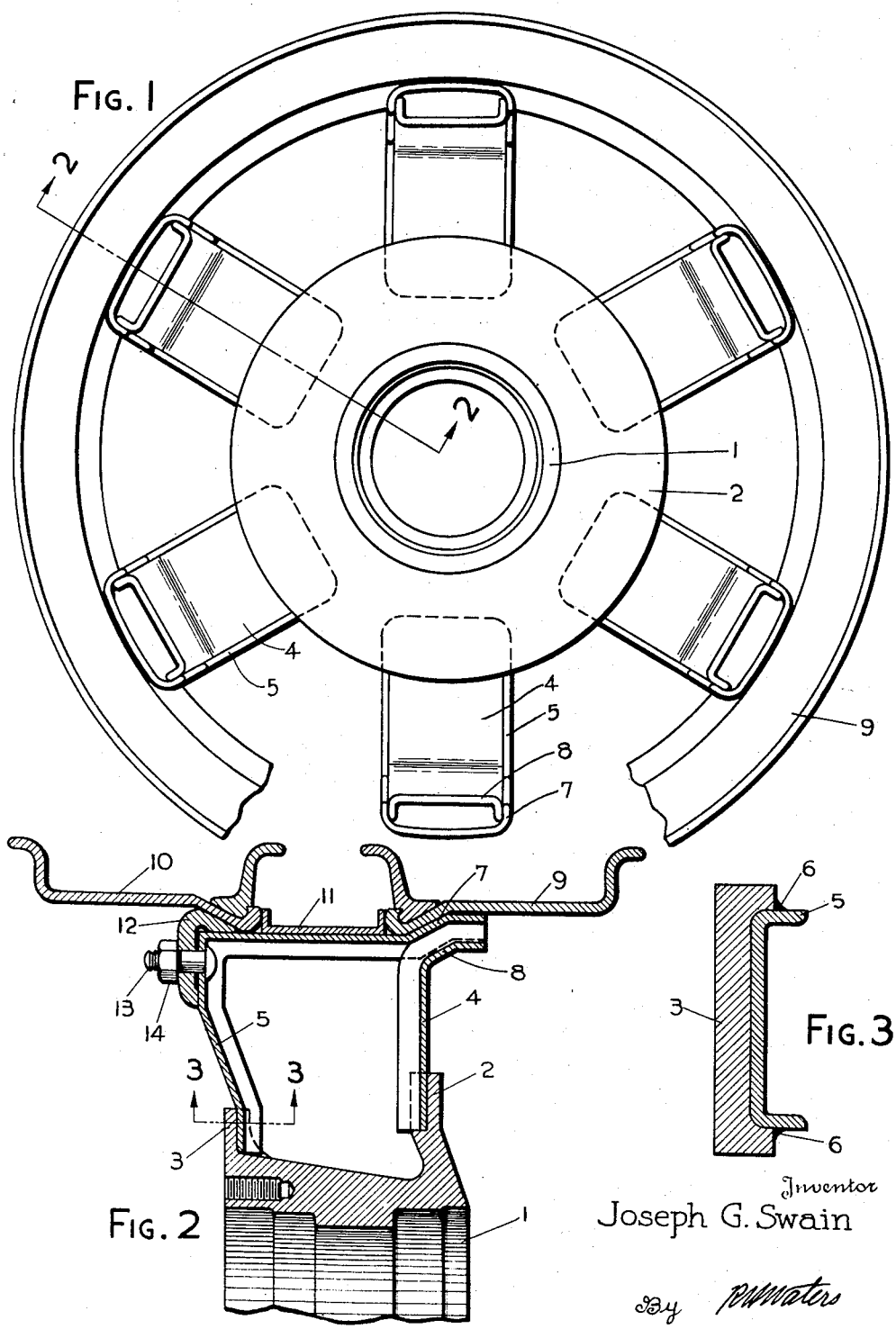
Inventor
Joseph G. Swain
By pmwaters
Attorney Dec. 22, 1953  J. G. SWAIN  2,663,592
WHEEL STRUCTURE
Filed Aug. 4, 1948  4 Sheets-Sheet 2
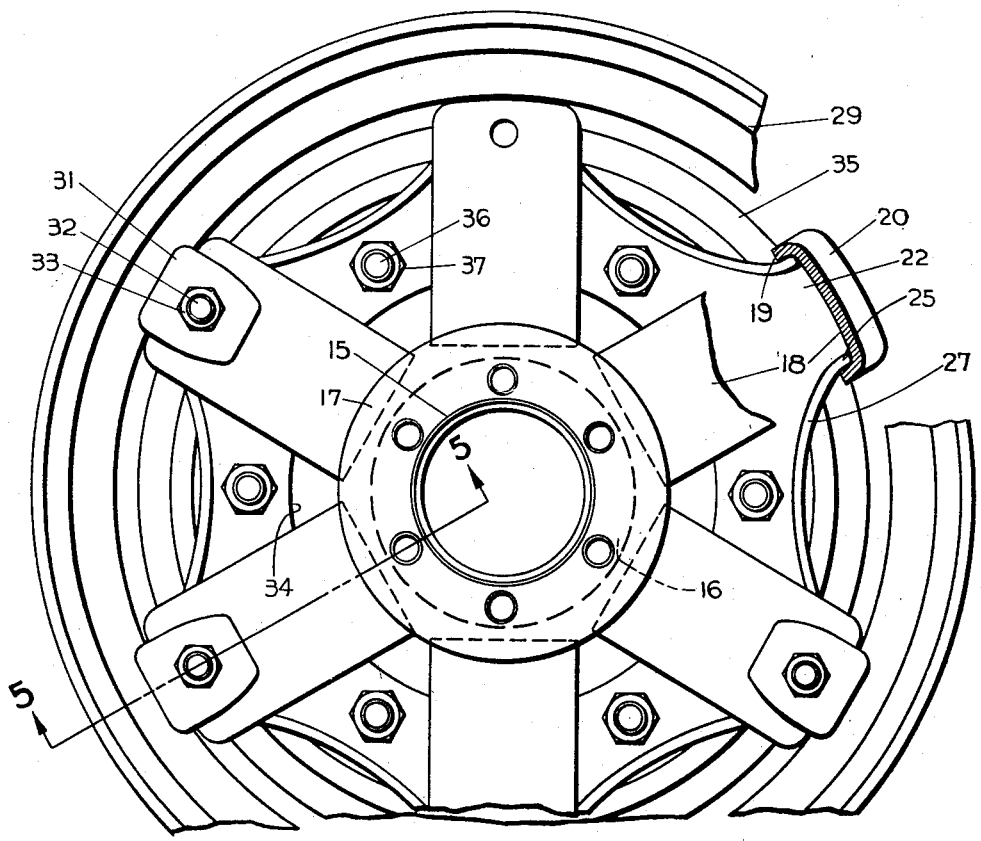
Fig. 4
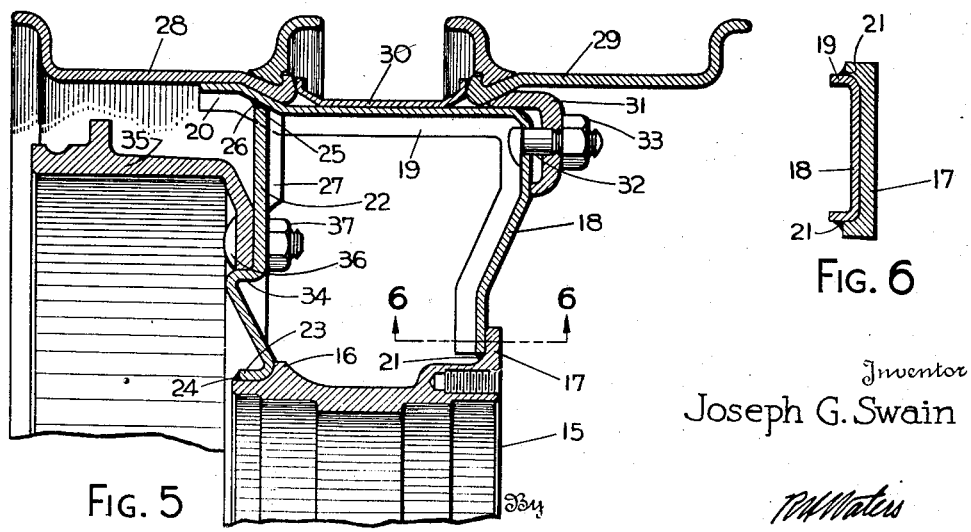
Fig. 5
Fig. 6
Inventor
Joseph G. Swain
Attorney Dec. 22, 1953   J. G. SWAIN   2,663,592
WHEEL STRUCTURE
Filed Aug. 4, 1948   4 Sheets-Sheet 3

INVENTOR.
BY Joseph G. Swain
Attorney

Dec. 22, 1953  J. G. SWAIN  2,663,592
WHEEL STRUCTURE
Filed Aug. 4, 1948  4 Sheets-Sheet 4
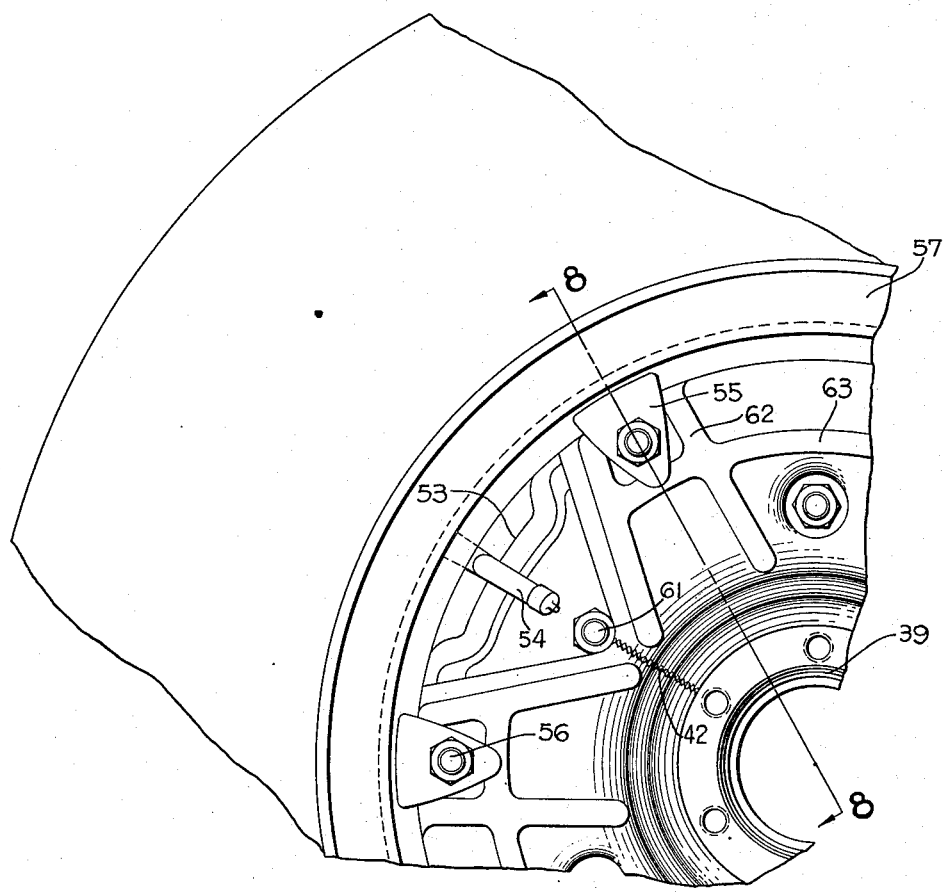
FIG. 9
FIG. 10
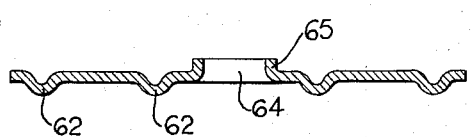
FIG. 11
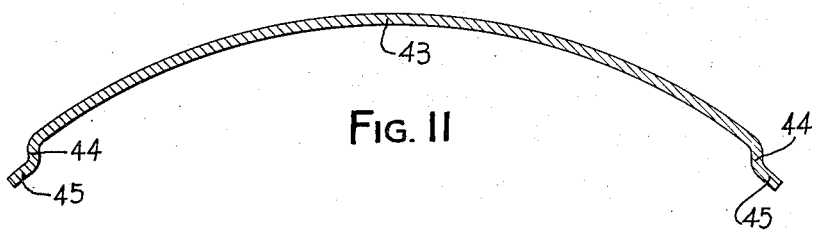
INVENTOR.
BY Joseph G. Swain
Attorney Patented Dec. 22, 1953

2,663,592

UNITED STATES PATENT OFFICE 2,663,592

WHEEL STRUCTURE

Joseph G. Swain, Akron, Ohio, assignor to Wingfoot Corporation, Akron, Ohio, a corporation of Delaware Application August 4, 1948, Serial No. 42,443

8 Claims. (Cl. 301—6)

The present invention relates to a wheel, and the primary objects of the invention are to build a truck wheel of materials such as steel or aluminum forgings, castings and stampings for supporting demountable rims in such a manner as to obtain lighter wheels and permit production at a more rapid rate with consequent reduction of labor costs. This application is a continuation in part of my application Ser. No. 632,829, filed December 5, 1945, and now abandoned.

Other objects of this invention will appear hereinafter as the description of the invention proceeds, the novel features, combinations and construction being more particularly pointed out in the specification hereunto appended.

In the drawings:

Fig. 1 is a fragmentary side elevation of a wheel (looking from the inboard side) embodying the invention;

Fig. 2 is a cross section on the line 2—2 in Fig. 1;

Fig. 3 is a section taken along the line 3—3 of Fig. 2;

Fig. 4 is a fragmentary side elevation partly in section of a wheel (looking from the outboard side) illustrating another embodiment of the invention;

Fig. 5 is a cross section taken on the line 5—5 of Fig. 4;

Fig. 6 is a cross section taken on the line 6—6 of Fig. 5;

Fig. 9 is a fragmentary elevational view showing the wheel with a rim and tire applied thereto;

Fig. 10 is a cross section taken along the line 10—10 of Fig. 7; and

Fig. 11 is a cross section taken substantially along the line 11—11 of Fig. 8.

Figure 7:
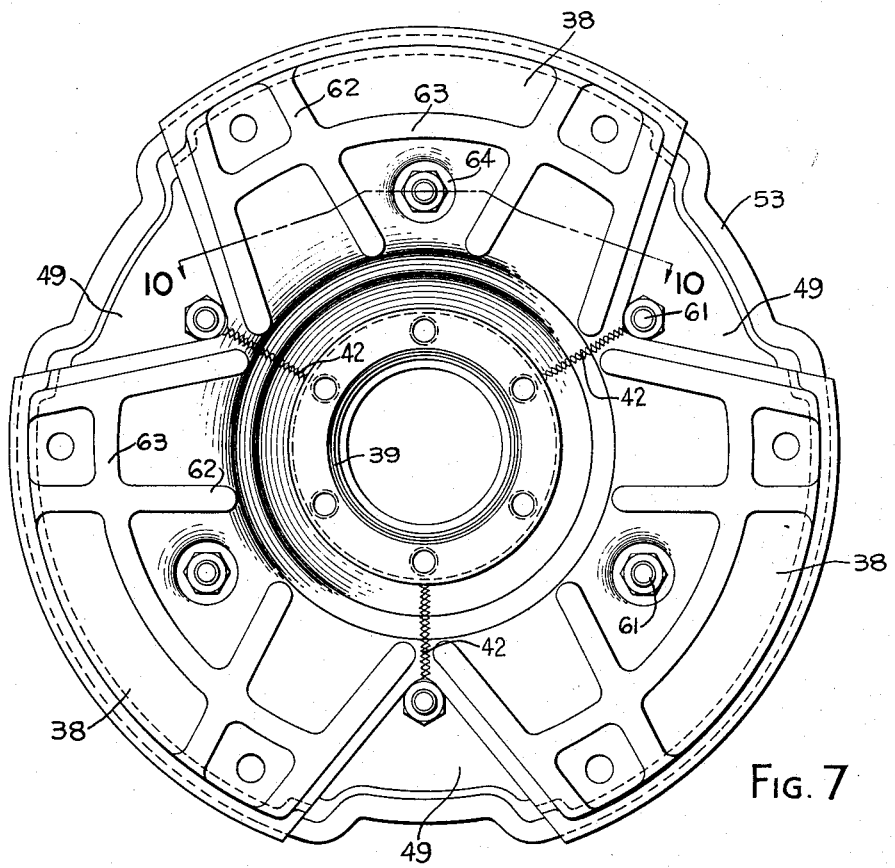
Fig. 7 is an elevation of a wheel showing a still further modification of the invention.

The wheel shown in Figs. 1 to 3, inclusive, has a hub 1 having two radially extending flanges 2 and 3, here shown as continuous but not necessarily so. Each of these flanges has radially extending grooves on their facing surfaces conforming in cross section to the outer surfaces of the radially extending arms 4 and 5 which are received by the grooves and welded to the flanges (see Fig. 3) as at 6. It will be understood that arm 4 is welded to flange 2 in a manner similar to that illustrated for arm 5 in Fig. 3. Bolting or riveting could be used for this purpose but these means are not generally as satisfactory as there is always too much tendency to shear the rivets or bolts, whereas, by welding, the parts are united into an integral one piece structure.

In Fig. 2 the inboard side of wheel is to the right, and outboard side to the left, and the arms and other parts will be referred to with respect to inboard or outboard sides for the sake of brevity.

The outboard arm 5 has at its outer end an axially extending rim supporting portion merging into an outwardly sloping seat portion 7 all of channel cross section. The inboard arm also has a similar outwardly sloping portion 8 engaging with and secured to the rim seat portion 7 on the inboard arm, the channeled flanges extending oppositely and being interfitted one within the other and secured permanently together by welding or the like. The outwardly sloping portion 8 could be omitted, if desired, and the end of the arm 4 be welded to the rim seat portion 7 on arm 5.

The two arms 5 and 8 so joined form a spoke of which there are six illustrated. These support at their outer ends inboard and outboard rims 9 and 10, respectively, spaced by a spacing ring 11 and held in place by removable lugs 12 secured in place by the usual bolts 13 and nuts 14.

The invention is not necessarily limited to a dual wheel assembly, as the features thereof could readily be changed for wheels employing only one rim or to wheels employing a permanent felloe instead of a removable rim.

The strengthening of the arms by the use of channel sections is unique and lends itself well to mass production with a lowered labor cost. The sections, which originally may be ordinary straight channel sections, are bent in any convenient manner, or may be stamped to final shape in one operation out of ordinary flat sheets. Aluminum or aluminum alloys or other light weight metals are suitable for this purpose as are also steel or steel alloys. The invention is not limited to the particular metal used as it is the construction of the wheel which makes it possible to use the lighter weight materials and to economize on materials to effect a savings in cost of production as well as a decided savings in weight without sacrificing strength. Lighter wheels mean better riding qualities for the vehicle mounted on such wheels and less damage to the tires as they are not impacted against the road with as much force.

In Figs. 4, 5 and 6 there is shown a modified form of the invention in which 15 represents the hub with flanges 16 and 17, the wheel here being shown with the inboard side to the left and the outboard side to the right. Metal arms 18 extend outwardly from the hub and are provided with the axially extending rim supporting portions 19 having the rim seating portions 20. These arms are substantially the same in all respects to the arms 5 in Figs. 1 to 3, inclusive. The arms, however, are shown as mounted in radially extending grooves as in the other figures and are secured to the inner face of the flange 17 by welding as at 21. The sides of the grooves give additional bracing against torsional strains.

The inner arms 4 of the first embodiment are replaced by a disk 22 having an axially extending flange 23 which seats on a correspondingly shaped seat on the hub and is secured thereto, as at 24, by welding.

The outer edge of the disk is scalloped, as clearly shown in Fig. 4, the outermost portions 25 of the disk engaging within the channeled section of the arm 18 near the rim seat and being secured thereto, as at 26, by welding or the like. The arcuate intermediate portions are braced by axially extending flanges 27 which extend outwardly to a position between the sides of the flanges of the channeled portion forming the rim seat 20.

Rims 28 and 29, spacing ring 30, clamping lugs 31, bolt 32 and nut 33, all correspond substantially to the similar parts 9, 10, 11, 12, 13 and 14 shown in Figs. 1 to 3, inclusive.

The disk 22 has a laterally offset portion 34 forming an annular seat for a brake drum 35 bolted in place by bolts 36 and nuts 37. The offset portion 34 and radial portion of the disk adjacent thereto form an excellent means of locating the drum and for holding it against shifting movement.

It will be obvious from the description that each of the arms 4, 5 and 18 as well as disk 22 may be stamped out, and assembled on the hub quickly by means of suitable jigs which accurately locate the positions of the rim seating portions and welding apparatus for positively connecting the parts into an assembled unit.

In the form of the invention shown in Figs. 7 to 11, inclusive, the wheel is made up of three segments indicated generally at 38. Each segment, at its inner edge, extends approximately 120° about the circumference of the hub 39 which has a recess 40 for receiving the inner edge of the segments. The segments are welded as at 41 to hold them firmly on the hub. The segments also are welded together along their meeting edges at 42, the meeting edges extending radially as indicated most clearly in Fig. 7.

Figure 8:
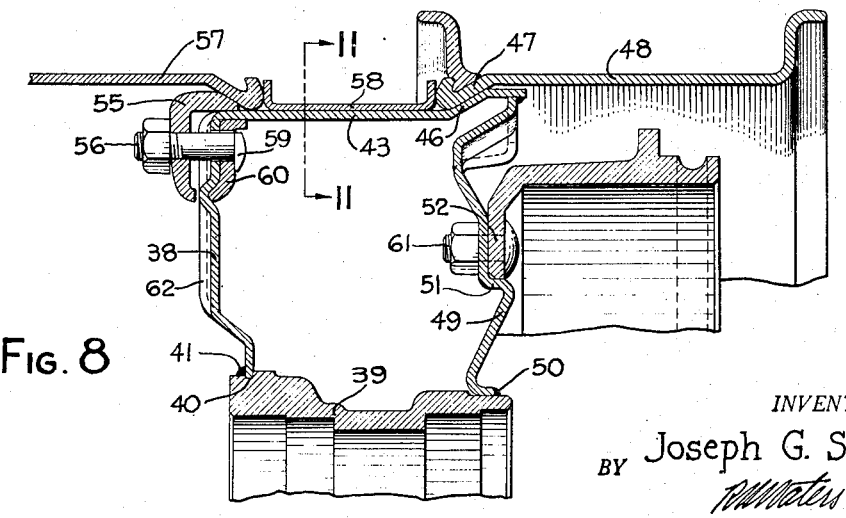
Fig. 8 is a cross section taken substantially along the line 8—8 of Fig. 9.

As shown most clearly in Fig. 8, the outer ends of the segments have axially extending rim supporting portions 43 have a cross section such as illustrated in Fig. 11 in which there are the downwardly extending flanges 44 which reinforce the edges to stiffen the rim supporting portion and the peripherally extending portions 45 on the flanges 44 which additionally provide for stiffening of the part 43. In cross section the rim supporting portion 43 is channel shaped, the same as shown in the other figures. It will be noted from Fig. 7 that the segments at their outer ends are spaced a substantial distance from each other to effect a saving in material used and also for another purpose which will be pointed out hereinafter. On the inboard side the rim supporting portion is provided with a seat 46 to receive the downwardly extending edge 47 of the inboard rim 48. The inboard ends of all of the rim supporting portions are supported by a disk 49 attached to the hub at 50 by welding. The inner edge of the disk 49 terminates in a tubular sleeve which fits over the hub. An offset portion 51 on the disk provides a seat for the brake drum 52, same as in Fig. 5 in connection with the offset portion 34. The outer edge of the disk may be scalloped in between one or more pairs of adjacent segments as at 53 to provide clearance for the valve stem 54 extending from the tire adapted to be mounted on the inboard rim 48.

Clamps 55 mounted on the studs or bolts 56 are used to clamp the outboard rim 57 and inboard rim 48 in position. A spacer ring 58 is placed between the rims 57 and 48 to transmit the clamping pressure to the inboard rim and for the purpose of keeping the rims properly spaced. This mounting of the rims is conventional and it is not intended that the invention is to be limited to the particular rim mounting shown. The inner ends of the studs or bolts 56 have heads 59 which abut against auxiliary lugs or pressure elements 60 which reinforce the segments at the point where the pressure of the bolts is applied. This prevents distortion of the metal of the segments and allows more clamping pressure to be applied to the bolts or studs. The brake drum 52 may be held in place as by the bolts 61.

The radially extending portions of the segments are provided with more or less radially extending ribs 62 and peripherally extending ribs 63 which stiffen the segments and prevent distortion thereof due to the strains applied thereto. The segments are also provided with the openings 64 which, as shown in Fig. 10, are provided with inwardly turned flanges 65. These openings 64 permit access to three of the bolts 61 which hold the brake drum 52 in place. The other three bolts are accessible through the spaces provided between the segments at their outer edges.

With the construction shown in Figs. 7 to 11, inclusive, it will be noted that the rigidity of the wheel, especially against torsional strains, is greatly improved over that shown in connection with the first two embodiments described in view of the fact that the segments abut each other throughout a substantial distance radially (approximately one-half of their radial dimension) and are rigidly secured together as by welding. With such a construction the torsional strains are resisted to a much greater extent than in the other embodiments described. The radially and peripherally extending ribs 62 and 63, as well as the flanges 44 and 45, provide stiffening means which operate to greatly increase the stiffness and strength of the segments so that when the load is applied it will be adequate to support that load with a minimum thickness of material.

The construction described in each of the modifications lends itself to either a simple stamping or forging operation, thus making it possible to make the wheel out of flat sheet metal parts in simple operations which greatly reduce the cost of manufacture. The wheel segments in the form of the invention shown in Figs. 7 to 11, inclusive, may be assembled by means of a jig to insure their proper relation to each other when welded together and to the hub. Additionally, it may be said of the invention shown in Figs. 7 to 11, inclusive, that its strength is greatly increased by the fact that each segment, as distinct from each spoke shown in the other forms of the invention, is provided with two instead of one lug. By having two lugs instead of one, the strength of the wheel is greatly increased due to the fact that any twisting movement on the segments in the plane of the wheel is resisted by the two bolts which prevent a turning movement of the segments in the plane of the wheel. With the other forms of the invention there is more opportunity for a pivoting action on the spokes when the torsional stresses are applied to the rim as when starting or stopping the vehicle to which the wheel is applied.

It will be borne in mind that the embodiments shown in the drawings are merely by way of example and are not in any way intended to limit the scope of the invention.

I claim:

1. In a vehicle wheel the combination with a hub having an annular seat having axially and radially facing disk-supporting walls, a disk having an annular portion engaging the aforesaid portions of said seat, said disk having a scalloped outer edge with axially extending portions reinforcing the scalloped edge, spokes secured to said hub in axially spaced relation to said disk and having at their outer ends axially extending rim supporting portions extending into proximity with the outer edge of said disc intermediate the scallops in said edges and being supported by and secured thereto, said disk having intermediate the outer and inner peripheries, an axially offset integral portion struck out of said disk to form an annular seat, and a brake drum having an inwardly extending flange supported on said seat and centered thereby and means for securing said drum to said disk.

2. A wheel comprising a hub, a plurality of similarly constructed generally radially extending elements formed of sheet metal stampings arranged in series peripherally of and secured to said hub, each having, at its outer end, an axially extending portion terminating in an outwardly flared demountable rim seat, said portion being transversely curved substantially concentric with the axis of said hub to increase its resistance to bending, and a generally radially extending supporting means spaced axially of the hub a substantial distance from said elements and secured on the hub and extending generally radially into engagement with the axially extending portions of said elements adjacent the rim seats thereon to resist inward movement thereof, and means for joining the supporting means to the hub and to the ends of the axially extending portions adjacent said rim seats thereon.

3. A wheel as set forth in claim 2 in which the radially extending elements are each provided with a plurality of rim clamping elements spaced peripherally from each other about the wheel axis for holding a rim against said flared seats on said axially extending portions.

4. A wheel comprising a hub, a plurality of wheel forming elements each similarly shaped, and each comprising a generally radially extending portion having the inner hub adjacent portions joined to each other at their adjacent edges by welding, a contiguous outer portion having its edges diverging from the corresponding edge of an adjacent element, said outer portions of said sections each having a contiguous axially extending portion transversely curved in an arc about the axis of the wheel and terminating in an outwardly flared rim seat, and the united inner hub adjacent ends of the sections being joined to said hub, and radially supporting means spaced axially of the hub a substantial distance from said elements and secured on the hub and extending generally into engagement with the axially extending portions of said elements adjacent the rim seats thereon to resist inward movement thereof, and means for joining the supporting means to the hub and to the ends of the axially extending portions adjacent said rim seats.

5. A wheel as set forth in claim 4 in which the transversely curved contiguous portions have their axially extending edges reinforced by inwardly extending ribs extending along the lateral edges thereof.

6. A wheel as set forth in claim 4 in which the transversely curved contiguous portions have their axially extending edges reinforced by inwardly and then peripherally extending ribs extending along the lateral edges thereof.

7. A wheel as set forth in claim 4 in which the free ends of the axially extending portions are supported by a generally disc shaped element secured to the hub and to the axially extending portion near its free end.

8. A wheel comprising a hub, a plurality of wheel forming elements each similarly shaped and each comprising a generally radially extending portion and having their inner hub-adjacent portions joined at their adjacent edges by welding, a contiguous outer portion having its edges diverging from the corresponding edges of adjacent elements, said outer portions of said sections each having a contiguous axially extending portion transversely curved in an arc about the axis of the wheel, and the inner ends of the elements being joined to said hub, the free ends of the axially extending portions being supported by a generally disc-shaped element secured to the hub and to the axially extending portions near their free ends and the disc being formed with a struck up drum supporting and locating ledge projecting axially away from the disc to form a substantially cylindrical drum seat.

JOSEPH G. SWAIN.

References Cited in the file of this patent

UNITED STATES PATENTS

| Number | Name | Date |
| --- | --- | --- |
| D. 156,291 | Swain | Nov. 29, 1949 |
| 977,737 | Haslup | Dec. 6, 1910 |
| 1,486,405 | White | Mar. 11, 1924 |
| 1,675,706 | Holmes | July 3, 1928 |
| 2,013,895 | Pannecouche | Sept. 10, 1935 |
| 2,355,743 | Mueller | Aug. 15, 1944 |
| 2,427,378 | Ash | Sept. 16, 1947 |
| 2,491,150 | Ash | Dec. 13, 1949 |

FOREIGN PATENTS

| Number | Country | Date |
| --- | --- | --- |
| 3,077 | Great Britain | Feb. 6, 1913 |
| 512,269 | France | 1921 |